United States Patent
Lee (10) Patent No.: US 10,693,162 B2
(45) Date of Patent: Jun. 23, 2020

(54) DEVICE AND METHOD FOR CONTROLLING FUEL CELL STACK CONNECTION

(71) Applicant: SK Innovation Co., Ltd., Seoul (KR)

(72) Inventor: Su Hyun Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 823 days.

(21) Appl. No.: 14/289,776

(22) Filed: May 29, 2014

(65) Prior Publication Data

US 2015/0188160 A1    Jul. 2, 2015

(30) Foreign Application Priority Data

Dec. 27, 2013    (KR) .................... 10-2013-0165614

(51) Int. Cl.
*H01M 8/04858* (2016.01)
*H01M 8/249* (2016.01)
(Continued)

(52) U.S. Cl.
CPC ....... *H01M 8/0488* (2013.01); *H01M 8/0494* (2013.01); *H01M 8/04559* (2013.01);
(Continued)

(58) Field of Classification Search
None
See application file for complete search history.

(56) References Cited

U.S. PATENT DOCUMENTS

| | | | |
|---|---|---|---|
| 2012/0175959 A1 | 7/2012 | Aastroem | |
| 2012/0292990 A1* | 11/2012 | Watanabe | H01M 8/0491 307/10.1 |
| 2013/0059220 A1* | 3/2013 | Kim | H01M 8/04947 429/431 |

FOREIGN PATENT DOCUMENTS

| | | |
|---|---|---|
| CN | 102785584 A | 11/2012 |
| EP | 0115418 A2 | 8/1984 |

(Continued)

OTHER PUBLICATIONS

Search report for related European Patent Application No. 14170716. 6, dated May 29, 2015 (6 pages).
(Continued)

*Primary Examiner* — Barbara L Gilliam
*Assistant Examiner* — Nathanael T Zemui
(74) *Attorney, Agent, or Firm* — Abelman, Frayne & Schwab (57) ABSTRACT

Device and method for controlling fuel cell stack connection. The device includes fuel cell stacks and a power conditioning unit connected to the stacks, and further includes: a memory storing a first critical value by which the connection control device starts an operation, second critical values ranging from zero to the first critical value, and a boundary value for placing the second critical values in at least two subsidiary ranges; stack voltage sensing units for sensing voltages of the stacks; and a control unit for determining whether sensed voltages have been reduced to the first critical value or greater, and starting to control the operation of a switching unit when any one of the sensed voltages has been reduced to the first critical value or greater, thereby placing one or more stacks having voltages associated with each one of the at least two subsidiary ranges in one of individual groups.

4 Claims, 5 Drawing Sheets

(51) Int. Cl.
*H01M 8/04537* (2016.01)
*H02J 1/10* (2006.01)
*H01M 8/04992* (2016.01)
*H01M 8/04828* (2016.01)
*H01M 8/04955* (2016.01)
*H01M 8/124* (2016.01)

(52) U.S. Cl.
CPC ... *H01M 8/04955* (2013.01); *H01M 8/04992* (2013.01); *H01M 8/249* (2013.01); *H02J 1/10* (2013.01); *H01M 2008/1293* (2013.01); *H02J 2300/30* (2020.01)

(56) References Cited

FOREIGN PATENT DOCUMENTS

| | | |
|---|---|---|
| JP | 06-096787 A | 4/1994 |
| JP | 2003-163017 A | 6/2003 |
| JP | 2007207620 A | 8/2007 |
| JP | 2013118806 A | 6/2013 |
| WO | 20120175784 A1 | 12/2012 |

OTHER PUBLICATIONS

Search report for related Japanese Patent Application No. 2014-115457, dated Nov. 15, 2017 (8 pages).

* cited by examiner

DEVICE AND METHOD FOR CONTROLLING FUEL CELL STACK CONNECTION

CROSS REFERENCE TO RELATED APPLICATION(S)

This application claims the benefit of Korean Patent Application No. 10-2013-0165614, filed on Dec. 27, 2013, entitled "Device and Method for Controlling Fuel Cell Stack Connection", which is hereby incorporated by reference in its entirety into this application.

BACKGROUND OF THE INVENTION

1. Field of the Invention

The present invention relates, in general, to a fuel cell system and, more particularly, to a device and method for controlling fuel cell stack connection in which a plurality of fuel cell stacks are included.

2. Description of the Related Art

In a solid oxide fuel cell (SOFC) system used for generating medium and large capacity power of several ten kilowatts (KW) to several megawatts (MW), a plurality of small capacity fuel cell stacks are connected to each other so as to form the desired medium and large capacity. The fuel cell stack has a structure in which several ten to several hundred unit fuel cells are stacked and connected together so as to create desired output power.

When using such a fuel cell stack, the following problems have arisen in recent years.

When forming a fuel cell system by connecting fuel cell stacks to each other in series, the fuel cell system is problematic in that, when a problem occurs in even one stack, the fuel cell system will be shut down. Further, when fuel cell stacks are connected together in parallel to form a fuel cell system, the fuel cell system is problematic in that, when a part of the stacks is deteriorated, the deterioration of the stack may be propagated to the other normal stacks. To avoid the above-mentioned problems, it is typical to use a fuel cell system, in which fuel cell stacks are appropriately connected together in series and in parallel.

However, the fuel cell system, in which the fuel cell stacks are connected together in series and in parallel, may be shut down as time goes by.

Another problem of the above-mentioned fuel cell system resides in that the fuel cell system is configured such that a single DC-DC converter of a power conditioning system (PCS) should treat a plurality of input voltages.

In the related art, the power conditioning system (PCS) typically includes a single DC-DC converter which functions to treat input voltages (for example, 40V to 80V) applied thereto from a plurality of fuel cell stacks. However, as the number of input voltages applied to the DC-DC converter is increased, the input voltage treatment cost of the DC-DC converter is increased, and the operational efficiency of the DC-DC converter is reduced, for example, the pulse rates (ripple rates) of the DC voltages are reduced, thereby reducing the operational efficiency of the power conditioning system.

Figure 1:
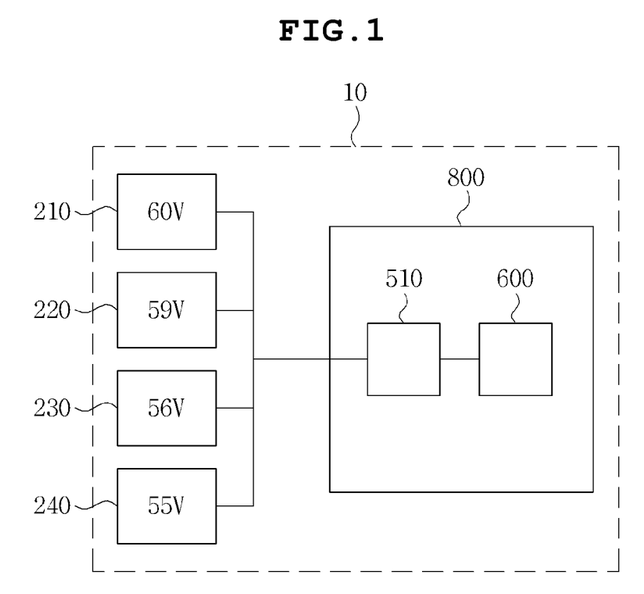
FIG. 1 is a block diagram illustrating the construction of a related art fuel cell system, in which voltages of a plurality of fuel cell stacks connected together in parallel are input to a single converter of a power conditioning system.

FIG. 1 is a block diagram illustrating the construction of a related art fuel cell system, in which voltages of a plurality of fuel cell stacks connected together in parallel are input to a single converter of a power conditioning system.

As shown in FIG. 1, when assuming that voltages of a plurality of fuel cell stacks 210, 220, 230 and 240 having had their original voltages of 60V remain at 60V, or reduced to 59V, 56V and 55V, respectively, due to external or internal shock, deterioration of deteriorated fuel cell stacks, for example, the fuel cell stacks 230 and 240 that have relatively highly reduced voltages of 56V and 55V will be quickly propagated to the other fuel cell stacks 210 and 220 because all the fuel cell stacks 210, 220, 230 and 240 are connected together in parallel. The quick propagation of deterioration of the deteriorated stacks to the other reduces the operational performance of the fuel cell stacks. Further, in the fuel cell system of FIG. 1, the number of input voltages required to be treated by the single DC-DC converter 510 of the power conditioning system (PCS) 800 is increased, so the operational efficiency of the DC-DC converter 510 is reduced, thereby greatly reducing both the operational efficiency of the power conditioning system and the operational performance of the fuel cell system 10. Here, the operational efficiency of the power conditioning system 800 may be expressed by multiplying the efficiency of the DC-DC converter 510 by the efficiency of a DC-AC inverter 600.

Accordingly, to solve the above-mentioned two problems, the following technologies are required.

First, a technology of placing the fuel cell stacks having the same or similar voltages in groups and of connecting the grouped fuel cell stacks together in parallel, instead of connecting the fuel cell stacks together in series-parallel, thereby reducing deterioration of the fuel cell stacks and reducing the shutdown of the fuel cell stacks is required. Second, another technology of distributing a plurality of DC voltages, which may be commonly input to a single DC-DC converter in a related art fuel cell system, to at least two DC-DC converters, thereby efficiently treating the input DC voltages and increasing the operational efficiency of a power conditioning system is required.

SUMMARY OF THE INVENTION

Accordingly, the present invention has been made keeping in mind the above problems occurring in the related art, and the present invention is intended to propose device and method for controlling fuel cell stack connection, in which fuel cell stacks having the same or similar voltages in a fuel cell system can be placed in groups and can be connected together in parallel, thereby reducing deterioration of the fuel cell stacks and reducing the shutdown of the fuel cell stacks, and in which a plurality of input voltages are distributed to at least two DC-DC converters, so the present invention can efficiently treat the input voltages and can increase the operational efficiency of the power conditioning system.

In order to achieve the above object, according to one aspect of the present invention, there is provided a device for controlling fuel cell stack connection, including a plurality of fuel cell stacks including an n number of fuel cell stacks, and a power conditioning unit connected to the plurality of fuel cell stacks, the device including: a memory storing therein a first critical value by which the fuel cell stack connection control device starts an operation, second critical values ranged from zero (0) to the first critical value, and a boundary value used to place the second critical values in at least two subsidiary ranges; a plurality of stack voltage sensing units for sensing voltages of the plurality of fuel cell stacks; and a control unit for determining whether sensed voltages are reduced to the first critical value or greater, and starting to control an operation of a switching unit when any one of the sensed voltages has been reduced to the first critical value or greater, thereby placing one or more fuel cell stacks having voltages associated with each one of the at least two subsidiary ranges in one of individual groups.

When the number of fuel cell stacks placed in an individual group is two or more, the switching unit may connect the fuel cell stacks placed in the individual group to each other in parallel, and may connect the individual groups to respective DC-DC converters installed in the power conditioning unit, wherein the DC-DC converters may be at least two DC-DC converters installed in the power conditioning unit.

The switching unit may be installed inside the power conditioning unit.

The memory may be installed inside the control unit.

The control unit may place the second critical values in the at least two subsidiary ranges using the boundary value.

The control unit may determine whether the sensed voltages have been reduced to the first critical value or greater, in which the first critical value may be a value equal to or less than a voltage difference between a $1^{st}$ fuel cell stack having a highest voltage and an $n^{th}$ fuel cell stack having a lowest voltage of the fuel cell stacks, and, when the control unit determines that the voltage difference has been reduced to the first critical value or greater, the control unit may determine a highest voltage value of the fuel cell stacks, and may determine difference values by subtracting subtrahend values that are the voltage values of the $1^{st}$ to $n^{th}$ fuel cell stacks from a minuend value that is the determined highest voltage value.

The control unit may control the operation of the switching unit in such a way that one or more fuel cell stacks having subtrahend values that determine the difference values associated with each one of the at least two subsidiary ranges are placed in one of the individual groups.

The number of at least two DC-DC converters may depend on the number of groups of one or more fuel cell stacks.

The power conditioning unit may be a power conditioning system.

The control unit may be installed inside the power conditioning unit.

In another aspect, the present invention provides a method of controlling fuel cell stack connection by controlling a fuel cell stack connection control device including a plurality of fuel cell stacks including an n number of fuel cell stacks, and a power conditioning unit connected to the plurality of fuel cell stacks, the method including: a) receiving a first critical value by which the fuel cell stack connection control device starts an operation, second critical values ranging from zero (0) to the first critical value, and a boundary value used to place the second critical values in at least two subsidiary ranges, by a control unit; b) sensing voltages of the plurality of fuel cell stacks by the control unit; and c) determining by the control unit whether sensed voltages have been reduced to the first critical value or greater, and starting to control an operation of a switching unit when the control unit determines that any one of the sensed voltages has been reduced to the first critical value or greater, thereby placing one or more fuel cell stacks having voltages associated with each one of the at least two subsidiary ranges in one of individual groups.

In operation c), the placing the fuel cell stacks in groups may further include: when the number of fuel cell stacks placed in an individual group is two or more, connecting the fuel cell stacks placed in the individual group to each other in parallel, and connecting the individual groups to respective DC-DC converters installed in the power conditioning unit by controlling the operation of the switching unit by the control unit.

The DC-DC converters may be at least two DC-DC converters installed in the power conditioning unit.

In operation c), the switching unit may be installed inside the power conditioning unit.

The first critical value, the second critical values and the boundary value may be stored in a memory, and the memory may be installed inside the control unit.

The method of controlling the fuel cell stack connection may further include: placing the second critical values in the at least two subsidiary ranges using the boundary value by the control unit between operation a) and operation b).

In operation c), the placing the fuel cell stacks in groups may further include: determining by the control unit whether the sensed voltages have been reduced to the first critical value or greater, in which the first critical value may be a value equal to or less than a voltage difference between a $1^{st}$ fuel cell stack having a highest voltage and an $n^{th}$ fuel cell stack having a lowest voltage of the fuel cell stacks; and determining a highest voltage value of the fuel cell stacks, and determining difference values by subtracting subtrahend values that are the voltage values of the $1^{st}$ to $n^{th}$ fuel cell stacks from a minuend value that is the determined highest voltage value by the control unit when the control unit determines that the voltage difference has been reduced to the first critical value or greater.

The placing the fuel cell stacks in groups may further include: placing one or more fuel cell stacks having subtrahend values that determine the difference values associated with each one of the at least two subsidiary ranges in one of the individual groups by controlling the operation of the switching unit by the control unit.

The number of at least two DC-DC converters may depend on the number of groups of one or more fuel cell stacks.

The power conditioning unit may be a power conditioning system.

The control unit may be installed inside the power conditioning unit.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms to describe most appropriately the best method he or she knows for carrying out the invention.

According to the present invention, it is possible to place the fuel cell stacks having the same or similar voltages in groups in the fuel cell system and to connect the fuel cell stacks together in parallel, thereby reducing deterioration of the fuel cell stacks and reducing the shutdown of the fuel cell stacks.

Further, according to the present invention, a plurality of input voltages applied to a DC-DC converter are distributed to at least two DC-DC converters, so the present invention can efficiently treat the input voltages and can increase the operational efficiency of the power conditioning system.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The above and other objects, features and advantages of the present invention will be more clearly understood from the following detailed description taken in conjunction with the accompanying drawings.

Reference now should be made to the drawings, in which the same reference numerals are used throughout the different drawings to designate the same or similar components.

Further, it will be understood that, although the terms "first," "second," etc. may be used herein to describe various elements, these elements should not be limited by these terms.

Further, when it is determined that the detailed description of the known art related to the present invention might obscure the gist of the present invention, the detailed description thereof will be omitted.

Hereinbelow, exemplary embodiments of the present invention will be described in detail with reference to the accompanying drawings.

Figure 2A:
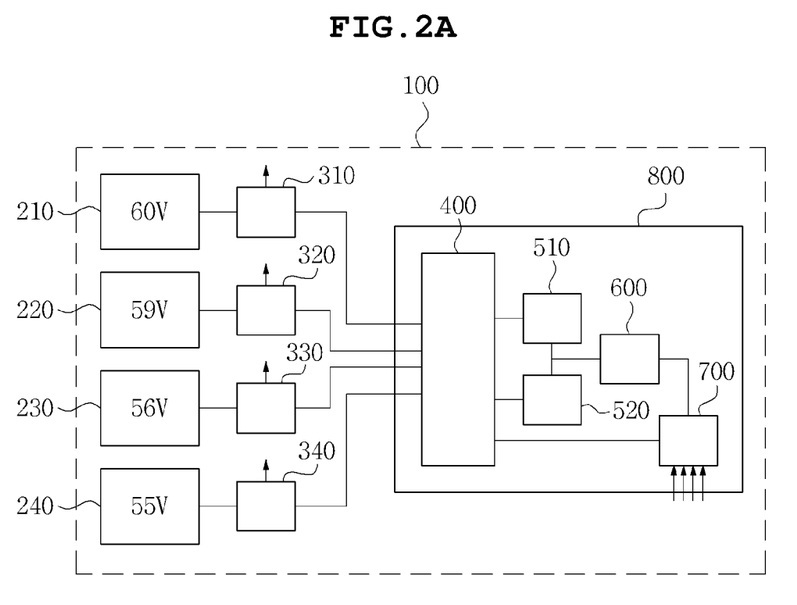
FIGS. 2A and 2B are block diagrams illustrating the construction of a fuel cell stack connection control device according to an embodiment of the present invention in which voltages of four fuel cell stacks are input to converters of a power conditioning system.
Figure 2B:
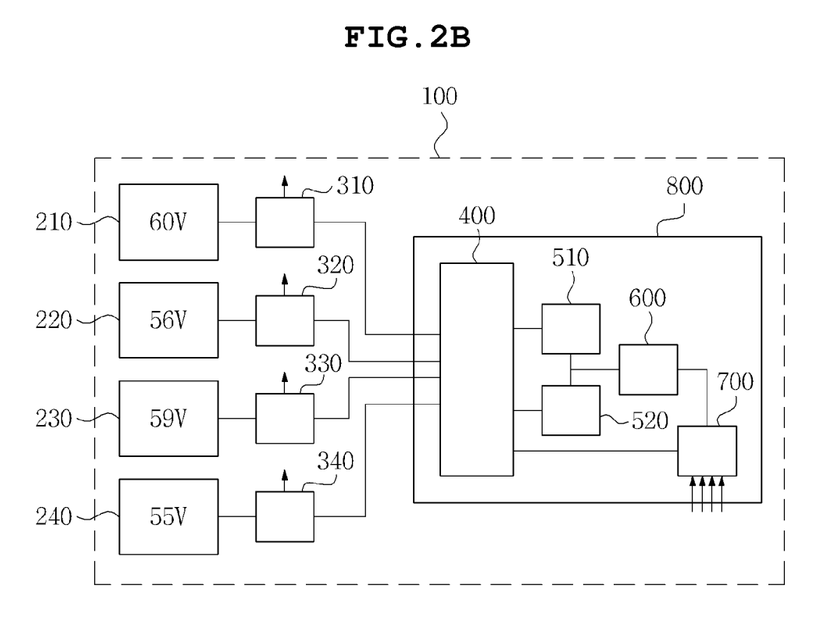

FIGS. 2A and 2B are block diagrams illustrating the construction of a fuel cell stack connection control device according to an embodiment of the present invention in which voltages of four fuel cell stacks are input to converters of a power conditioning system;

Prior to disclosing the operation of the fuel cell stack connection control device according to the present invention, the construction and function of the fuel cell stack connection control device will be described hereinbelow with reference to FIGS. 2A and 2B.

Construction and Function of Fuel Cell Stack Connection Control Device

As shown in FIGS. 2A and 2B, the fuel cell stack connection control device 100 includes: a plurality of stack voltage sensing units, for example, four stack voltage sensing units 310, 320, 330 and 340 in this embodiment that sense respective states of a plurality of fuel cell stacks, for example, four fuel cell stacks 210, 220, 230 and 240 in this embodiment; and a power conditioning system (PCS) 800 to which input voltages of the four fuel cell stacks are applied.

The power conditioning system 800 includes: a switching unit 400 that can place a plurality of fuel cell stacks in one of at least two individual groups according to values specified by a user which will be described later herein, and connects the at least two individual groups to at least two DC-DC converters 510 and 520 corresponding to the respective groups; the at least two DC-DC converters 510 and 520 configured such that the DC-DC converters 510 and 520 are connected to the switching unit 400 and convert input voltages of the fuel cell stacks determined in the groups into predetermined direct currents (DC); a DC-AC inverter 600 that is connected to the DC-DC converters 510 and 520, and converts the direct currents (DC) output from the DC-DC converters into alternating currents (AC); a control unit 700 that is connected both to a plurality of stack voltage sensing units 310, 320, 330 and 340 and to the switching unit 400, and controls the operation for sensing voltages of a plurality of fuel cell stacks, and controls ON/OFF operations of a plurality of switch elements of the switching unit 400. Here, the switching unit is also configured such that, when the number of fuel cell stacks placed in an individual group is two or more, the switching unit connects the fuel cell stacks placed in the individual group to each other in parallel, and connects the parallel connected fuel cell stacks to an associated one of the DC-DC converters Here, the DC-DC converters are configured such that two or more DC-DC converters are installed in the power conditioning system 800, so, when inputting respective input voltages of the plurality of fuel cell stacks to the DC-DC converters, the input voltages can be distributed to the at least two DC-DC converters, thereby being efficiently treated by the at least two DC-DC converters at low cost.

Further, the switching unit 400 may include switch elements each having two or three switching terminals. However, it should be understood that the switching unit may include other type switch elements (for example, diodes, FETs, transistors or a combination thereof) that may perform the same functions as the above-mentioned switch elements or may be appropriately configured as desired by a user without being limited to the above-mentioned configuration.

The control unit 700 includes a memory (not shown). Here, a first critical value, second critical values and a boundary value for placing the second critical values in at least two subsidiary ranges are input previously to the memory, thereby being stored in the memory. The first critical value is a value by which the fuel cell stack connection control device will start the operation for connecting the fuel cell stacks to each other. Here, the first critical value is determined by a voltage difference between a $1^{st}$ fuel cell stack 210 (see FIGS. 2A and 2B) having a highest voltage among the voltages of the fuel cell stacks 210, 220, 230 and 240 and a $4^{th}$ fuel cell stack 240 (see FIGS. 2A and 2B) having a lowest voltage among the voltages of the fuel cell stacks 210, 220, 230 and 240. The second critical values are values ranged from zero (0) to the first critical value, so, when the first critical value is determined, the second critical values will be automatically determined. The boundary value is a value that is necessarily used to place the second critical values in at least two subsidiary ranges and is required to be used when placing the fuel cell stacks in groups. Accordingly, when receiving the second critical values from the memory, the control unit can place the second critical values in the at least two ranges using the boundary value. In other words, upon receiving the first and second critical values and the boundary value from the memory, the control unit can create at least two subsidiary ranges.

In the present invention, the first and second critical values and the boundary value may be values specified by a user, for example, experimentally measured values, statistically measured values, estimatively measured values, etc., which may be used to prevent deterioration of fuel cell stacks, although the critical values and the boundary value may be other type values specified by a user without being limited to the above-mentioned specific values. The first and second critical values and the boundary value are previously stored in the memory of the control unit. Further, although the present invention has been described in that the memory is installed inside the control unit, the memory may be installed outside the control unit without being limited to the above-mentioned location inside the control unit.

Further, the control unit 700 is configured such that, when any one of voltages sensed by the plurality of stack voltage sensing units has been reduced to the first critical value or greater, the control unit 700 starts to control the ON/OFF operation of the switching unit 400 such that the switching unit 400 can place one or more fuel cell stacks having voltages associated with each one of the at least two subsidiary ranges in one of individual groups or in one of at least two individual groups, and, when it is required to connect the fuel cell stacks placed in an individual group to each other in parallel (in the case that the number of fuel cell stacks placed in the individual group is two or more), the switching unit 400 can connect the fuel cell stacks together in parallel, and connect the parallel connected fuel cell stacks placed in the individual groups to the respective DC-DC converters of the power conditioning system (Of course, when only one fuel cell stack is placed in an individual group, it is not required to connect the fuel cell stack in parallel). In other words, the switching unit is controlled by the control unit such that, when two or more fuel cell stacks are placed in an individual group, the switching unit connects the fuel cell stacks placed in the individual group to each other in parallel, and connects the individual groups to the respective DC-DC converters of the power conditioning system.

Although the present invention has been described in that both the control unit 700 and the switching unit 400 are installed inside the power conditioning system 800, at least one of the control unit 700 and the switching unit 400 may be installed outside the power conditioning system 800 without being limited to the above-mentioned location inside the power conditioning system 800.

Hereinbelow, an example of a method in which the fuel cell stack connection control device places the fuel cell stacks having the same or similar voltages in groups, and connects the fuel cell stacks together in parallel will be described in detail.

Fuel Cell Stack Connection Control Method

First, it is assumed that the four fuel cell stacks 210, 220, 230 and 240 have the same voltage of 60V in an initial stage, and that the first critical value by which the fuel cell stack connection control device will start a switch connecting operation has been set to 5V (because the second critical values range from zero (0) to the first critical value as described above, the second critical values have been automatically set to values ranging between zero (0) and 5V), and that the boundary value used to place the second critical values in at least two groups has been set to 2V", and that the above-mentioned values have been input to and stored in the memory of the control unit.

When the fuel cell stack connection control device is operated, the control unit creates two subsidiary ranges upon receiving the first and second critical values, and the boundary value from the memory. Here, due to the boundary value of 2V, the two subsidiary ranges are set to a range between zero (0) or greater and two (2) or less (0≤second critical value≤2) and to another range between greater than two (2) and five (5) or less (2<second critical value≤5).

When the voltages of the four fuel cell stacks 210, 220, 230 and 240 have become 60V, 59V, 56V and 55V, respectively, due to internal or external environmental variations as shown in FIG. 2A, and when the control unit 700 has determined that the difference between voltages sensed by the plurality of stack voltage sensing units 310, 320, 330 and 340 mounted to the respective fuel cell stacks, that is, the voltage difference between the $1^{st}$ fuel cell stack 210 having the highest voltage and the $4^{th}$ fuel cell stack 240 having the lowest voltage, has been reduced to 5V or greater, the control unit 700 will start to control the operation of the switching unit because the voltage difference agrees with the first critical value (5V). Here, the first critical value may be a value equal to or less than the voltage difference.

Thereafter, the control unit 700 creates the following mapping table [Table 1] and stores the mapping table in the memory.

TABLE 1

| No. of Stacks | Voltages of Stacks (V) | Δ(V) |
|---|---|---|
| $1^{st}$ fuel cell stack | 60 | 0 |
| $2^{nd}$ fuel cell stack | 59 | 1 |
| $3^{rd}$ fuel cell stack | 56 | 4 |
| $4^{th}$ fuel cell stack | 55 | 5 |

In Table 1, Δ is a value that is determined by subtracting a voltage of each of the fuel cell stacks ($1^{st}$ fuel cell stack to $4^{th}$ fuel cell stack) from the highest voltage among the sensed voltages of the fuel cell stacks. In other words, the highest voltage value is a "minuend value", the voltage value of each of the fuel cell stacks is a "subtrahend value", and Δ is a "difference value".

For example, the voltage value of the fuel cell stacks 210 having the highest voltage of the four fuel cell stacks is 60 V, and the voltage value of the $1^{st}$ fuel cell stack is 60 V, so the difference value (Δ) between them becomes 0 V, and this is the ground of setting the lower limit value of the range of the second critical values to zero (0).

Thereafter, the control unit 700 places the fuel cell stacks having subtrahend values that can create difference values (Δ) associated with the two subsidiary ranges, that is, 0≤second critical value≤2, and 2<second critical value≤5, in groups. Here, the fuel cell stacks having ΔV associated with the range of 0≤ΔV≤2, for example, the fuel cell stacks 210 and 220 in Table 1, are placed in a first group, and the fuel cell stacks having ΔV associated with the range of 2<ΔV≤5, for example, the fuel cell stacks 230 and 240 in Table 1, are placed in a second group.

Here, it should be noted that the number of groups of stacks does not depend on the number of subsidiary ranges.

For example, in the above embodiment, the subsidiary ranges formed by placing the second critical values in groups are set to two ranges, that is, a range of 0≤second critical value≤2 and another range of 2<second critical value≤5, so the number of the subsidiary ranges looks like equal to the number of groups of stacks. However, it should be understood that, even when the subsidiary ranges of this embodiment are set to three ranges, that is, 0≤second critical value≤2, 2<second critical value≤3, and 3<second critical value≤5, the number of groups of stacks will remain two groups because ΔV associated with the subsidiary range of 2<second critical value≤3 does not exist in this embodiment. In the present invention, it should be understood that the number of groups of stacks does not depend on the number of subsidiary ranges (specifically described, the number of groups of stacks is equal to or less than the number of subsidiary ranges created by the second critical values), but depends on the number of two or more DC-DC converters that will be described later herein, so the number of groups of stacks should be at least two. Accordingly, the number of two or more groups of stacks is determined by the number of two or more DC-DC converters.

Thereafter, the control unit 700 controls the ON/OFF operation of the switching unit 400, thereby connecting the fuel cell stacks associated with individual group of at least two groups, that is, the first group and the second group, to each other in parallel (connecting the fuel cell stacks 210 and 220 together in parallel, and connecting the fuel cell stacks 230 and 240 together in parallel). The control unit 700 also connects the fuel cell stacks that have been connected together in parallel in respective groups to the respective DC-DC converters 510 and 520 of the power conditioning system 800. In other words, the control unit 700 connects the fuel cell stacks 210 and 220 that have been connected together in parallel to the first DC-DC converter 510 of the at least two DC-DC converters, and connects the fuel cell stacks 230 and 240 that have been connected together in parallel to the second DC-DC converter 520 of the at least two DC-DC converters.

In other words, the control unit 700 connects the relatively normal fuel cell stacks 210 and 220 to each other in parallel and connects the stacks 210 and 220 to the first DC-DC converter 510. The control unit 700 also connects the relatively deteriorated fuel cell stacks 230 and 240 to each other in parallel and connects the stacks 230 and 240 to the second DC-DC converter 520.

As described above, the fuel cell stack connection control device 100 places the fuel cell stacks having the same or similar voltages in groups, and connects the fuel cell stacks in individual group in parallel, thereby reducing deterioration of fuel cell stacks and reducing shutdown of the fuel cell stacks. The fuel cell stack connection control device 100 also distributes the voltages of the four fuel cell stacks which may be commonly input to a single DC-DC converter in a related art fuel cell system to the at least two DC-DC converters, thereby efficiently treating the input voltages and increasing the operational efficiency of the power conditioning system 800.

FIG. 2B is a block diagram similar to that of FIG. 2A, but the voltage values of the two fuel cell stacks 220 and 230 of FIG. 2B are different from those of FIG. 2A.

In other words, unlike FIG. 2A in which the voltage values of the four fuel cell stacks are arrayed in a descending series, the voltage values of the four fuel cell stacks in FIG. 2B are arrayed randomly.

FIG. 2B is intended to emphasize the function of the present invention in that, although the voltage values of the plurality of fuel cell stacks which have been changed due to external or internal environmental shock are arrayed in any array order, the present invention can efficiently place the fuel cell stacks in groups and can efficiently connect the fuel cell stacks placed in individual group to each other in parallel, and can connect the fuel cell stacks of respective groups to respective DC-DC converters according to the above-mentioned mapping table.

Accordingly, in the same manner as that described for the embodiment of FIG. 2A, the embodiment of FIG. 2B will perform a desired function in that the relatively normal fuel cell stacks 210 and 230 can be connected to each other in parallel and can be connected to the first DC-DC converter 510, and the relatively deteriorated fuel cell stacks 220 and 240 can be connected to each other in parallel and can be connected to the second DC-DC converter 520.

Figure 3A:
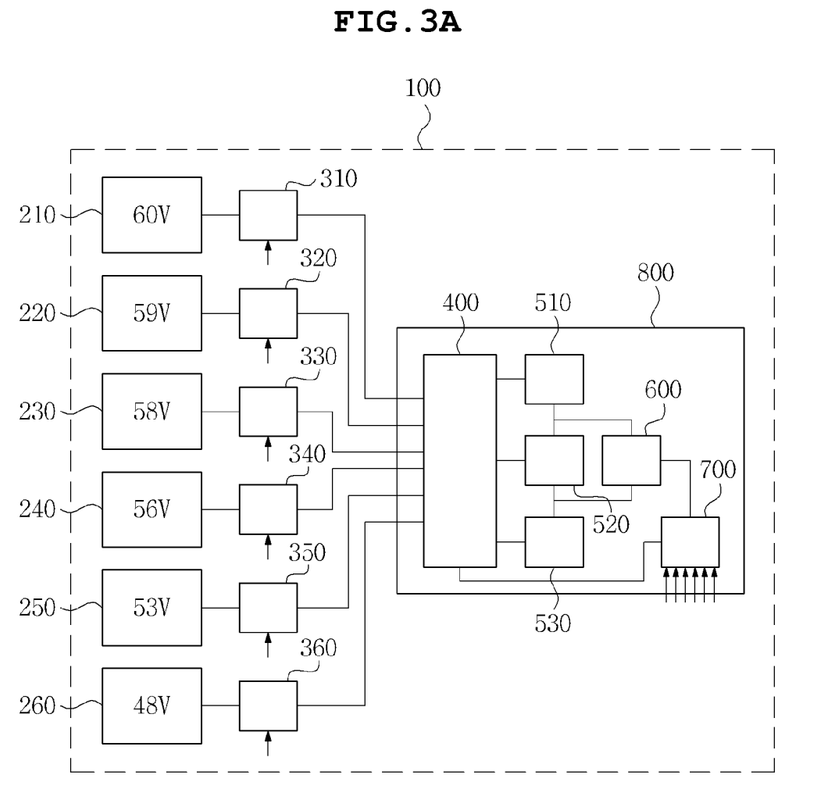
FIGS. 3A and 3B are block diagrams illustrating the construction of a fuel cell stack connection control device according to another embodiment of the present invention in which voltages of six fuel cell stacks are input to the converters of the power conditioning system.
Figure 3B:
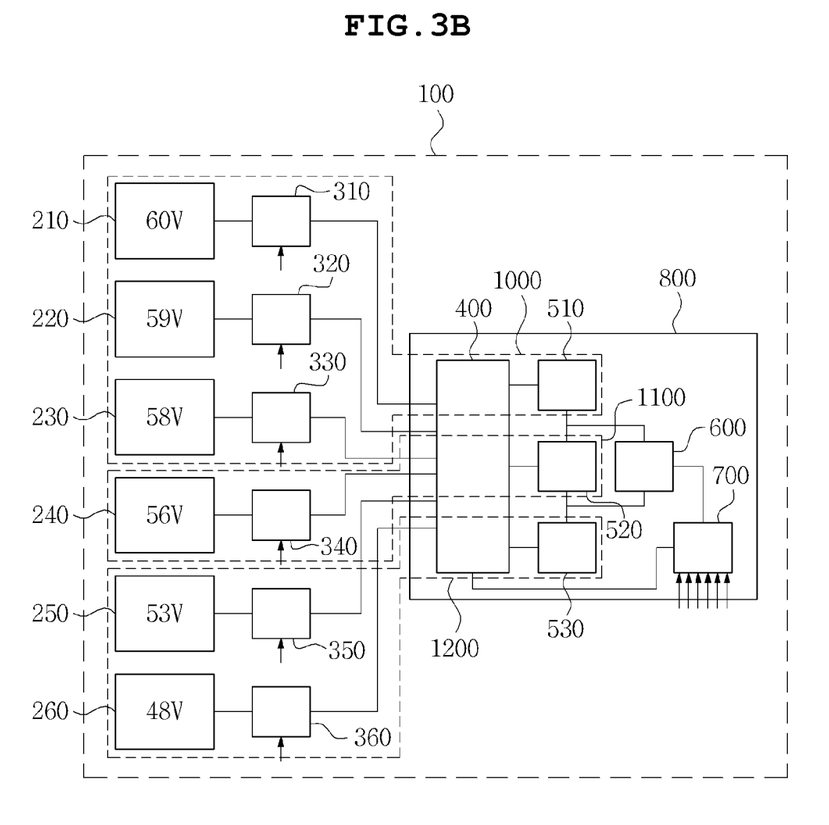

FIGS. 3A and 3B are block diagrams illustrating the construction of a fuel cell stack connection control device according to another embodiment of the present invention in which voltages of six fuel cell stacks are input to the converters of the power conditioning system The construction and operation of the fuel cell stack connection control device 100 shown in FIGS. 3A and 3B remain the same as those described for the device shown in FIGS. 2A and 2B, and further explanation of the construction and operation of the fuel cell stack connection control device is thus omitted. Described in brief, FIGS. 3A and 3B are intended to illustrate an embodiment in which the fuel cell stacks are placed in three groups.

In this embodiment, it is assumed that the first critical value is set to 12V as an example, and the boundary values used to place the second critical values in three subsidiary ranges are set to 2V and 5V. In this case, the second critical values are automatically set to values ranging from 0V to 12V, as described above.

Thus, when the voltage difference between the highest voltage and the lowest voltage of the stacks has been reduced to 12V or greater, the fuel cell stack connection control device 100 of this embodiment will start to control the operation of the switching unit 400. In this case, the control unit 700 will create three subsidiary ranges, that is, 0≤second critical value≤2, 2<second critical value≤5, and 5<second critical value≤12 using the boundary values.

As shown in FIGS. 3A and 3B, when the voltage difference between the highest voltage value 60V and the lowest voltage value 48V of the fuel cell stacks becomes 12V, the control unit 700 can sense the voltage difference using a plurality of stack voltage sensing units 310, 320, 330, 340, 350 and 360, and places one or more fuel cell stacks having voltages associated with each one of the three subsidiary ranges, that is, 0≤second critical value≤2, 2<second critical value≤5, and 5<second critical value≤12 (three groups, that is, first group 1000, second group 1100 and third group 1200 are formed as shown in FIG. 3B). Here, when two or more fuel cell stacks are placed in an individual group (first group 1000 and third group 1200), the control unit 700 controls the operation of the switching unit 400 such that the switching unit 400 connects the fuel cell stacks placed in each of the first and third groups 1000 and 1200 together in parallel, and then connects the three groups (first group 1000, second group 1100 and third group 1200) to the first, third and second DC-DC converters 510, 530 and 520, respectively.

Thereafter, the control unit 700 creates the following mapping table [Table 2] and stores the mapping table in the memory.

TABLE 2

| No. of Stacks | Voltages of Stacks (V) | Δ(V) |
|---|---|---|
| 1$^{st}$ fuel cell stack | 60 | 0 |
| 2$^{nd}$ fuel cell stack | 59 | 1 |
| 3$^{rd}$ fuel cell stack | 58 | 2 |
| 4$^{th}$ fuel cell stack | 56 | 4 |
| 5$^{th}$ fuel cell stack | 53 | 7 |
| 6$^{th}$ fuel cell stack | 48 | 12 |

Although the first critical value, the second critical values placed in subsidiary ranges, and the number of subsidiary ranges have been disclosed for illustrative purposes in the above description for the embodiments, it should be understood that the first critical value, the second critical values placed in subsidiary ranges, and the number of subsidiary ranges may be changed as desired by a user.

Further, although the four or six fuel cell stacks and the stack voltage sensing units mounted to the respective fuel cell stacks have been disclosed for illustrative purposes in the above description for the embodiments, it should be understood that the fuel cell stack connection control device of the present invention may include an n number of fuel cell stacks and an n number of stack voltage sensing units mounted to the respective fuel cell stacks, without being limited to the above-mentioned configurations.

Figure 4:
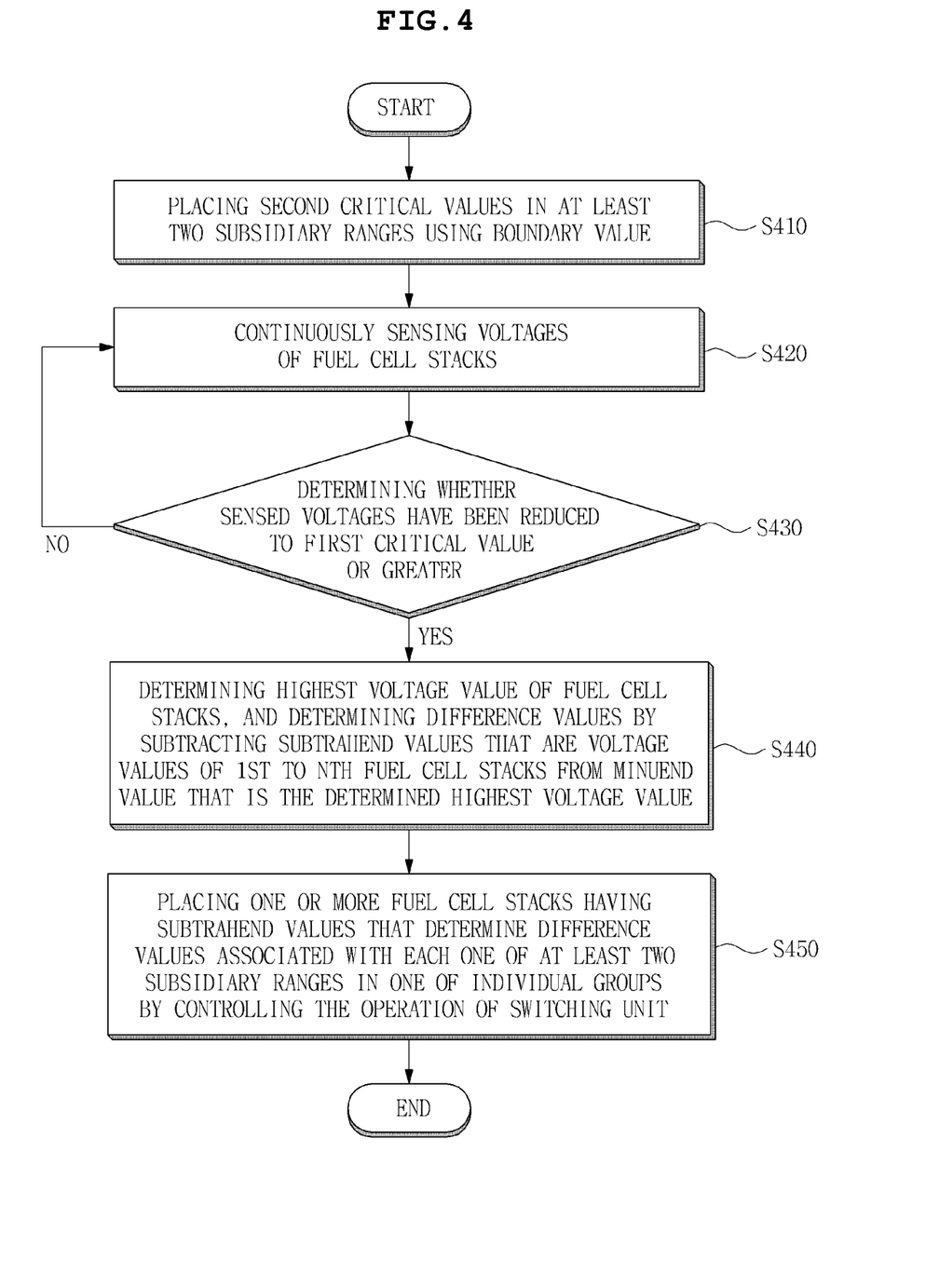
FIG. 4 is a flowchart illustrating a method of controlling the operation of a fuel cell stack connection control device using a control unit according to an embodiment of the present invention.

Method of Controlling Fuel Cell Stack Connection Control Device Performed by Control Unit FIG. 4 is a flowchart illustrating a method of controlling the operation of a fuel cell stack connection control device using a control unit according to an embodiment of the present invention.

In an initial stage of the method of controlling the operation of the fuel cell stack connection control device, the first critical value, the second critical values including zero (0) and automatically determined by the first critical value, and the boundary value used to place the second critical values in at least two subsidiary ranges are input from the memory to the control unit.

At operation S410 of FIG. 4, the control unit places the second critical values in at least two subsidiary ranges using the boundary value.

At operation S420, the control unit continuously senses the voltages of the fuel cell stacks by controlling the operation of the plurality of stack voltage sensing units.

Thereafter, at operation S430, the control unit determines whether any one of sensed voltages has been reduced to the first critical value or greater. In this case, as described above, the first critical value may be a value equal to or less than a voltage difference between the $1^{st}$ fuel cell stack having the highest voltage and the $n^{th}$ fuel cell stack having the lowest voltage of the fuel cell stacks.

When the control unit determines at operation S430 that the voltage difference has been reduced to the first critical value or greater, the control unit determines the highest voltage value of the fuel cell stacks at operation S440. Thereafter, the control unit determines difference values by subtracting the subtrahend values that are the voltage values of the $1^{st}$ to $n^{th}$ fuel cell stacks from a minuend value that is the determined highest voltage value.

When the control unit determines at operation S430 that the sensed voltages have not been reduced to the first critical value or greater, the process returns to operation S420.

At operation S450, the control unit controls the operation of the switching unit in such a way that one or more fuel cell stacks having subtrahend values that determine the difference values associated with each one of the at least two subsidiary ranges can be placed in one of individual groups, and the process is terminated.

The technology disclosed in the description of this invention may be variously embodied according to applications thereof. For example, the technology of this invention may be embodied in the form of hardware, firmware, software or the optional combination thereof. In an embodiment embodied in the form of hardware, the control circuit or the control unit may be embodied in the form of one or more application specific integrated circuits (ASICs), digital signal processors (DSPs), field programmable gate arrays (FPGAs), processors, controllers, microcontrollers, microprocessors, electronic devices, other electronic units designed to perform the functions disclosed in the description of this invention, and a combination thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Further, simple changes and modifications of the present invention are appreciated as included in the scope and spirit of the invention, and the protection scope of the present invention will be defined by the accompanying claims.

What is claimed is:

1. A device for controlling fuel cell stack connection, comprising a plurality of fuel cell stacks and a power conditioning unit connected to the plurality of fuel cell stacks, the device comprising:
    a memory storing therein a predetermined first critical value, a first range from zero (0) to the first critical value, and at least one predetermined boundary value used to divide the first range into at least two subsidiary ranges;
    a plurality of stack voltage sensing units for sensing voltages of the plurality of fuel cell stacks; and
    a control unit configured to:
        define a plurality of groups corresponding in number to the at least two subsidiary ranges, such that each of the plurality of groups is assigned a range corresponding to a respective one of the at least two subsidiary ranges;
        monitor the plurality of stack voltage sensing units;
        then determine a highest voltage sensed among the plurality of fuel cell stacks;
        then calculate, for each fuel cell stack, a difference value between the voltage of that fuel cell stack and the highest voltage; and
        then control a switching unit, for each fuel cell stack, to switch that fuel cell stack into a specific one of the defined plurality of groups that has a range corresponding to the calculated difference value.

2. The device controlling the fuel cell stack connection as set forth in claim 1, wherein, when the number of fuel cell stacks placed in an individual group is two or more, the switching unit connects the fuel cell stacks placed in each group to each other in parallel, and connects each of the groups to respective DC-DC converters installed in the power conditioning unit.

3. The device controlling the fuel cell stack connection as set forth in claim 1, wherein the switching unit is installed inside the power conditioning unit.

4. The device controlling the fuel cell stack connection as set forth in claim 1, wherein the memory is installed inside the control unit.

* * * * *